United States Patent Office 2,965,629
Patented Dec. 20, 1960

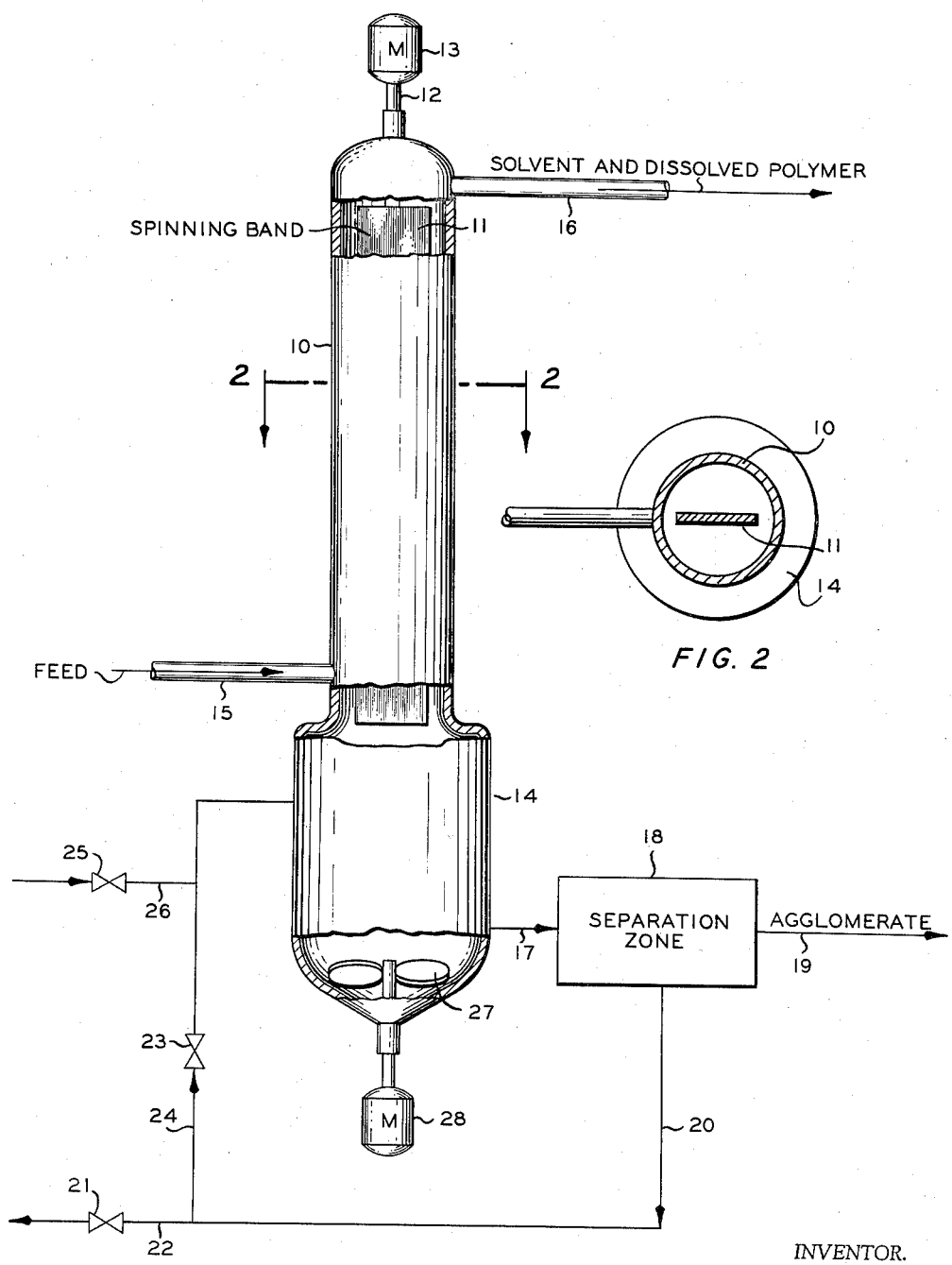

2,965,629

REMOVING DISPERSED SOLIDS FROM A POLYMER SOLUTION

William L. Fawcett, Bartlesville, Okla., assignor to Phillips Petroleum Company, a corporation of Delaware Filed Dec. 16, 1957, Ser. No. 703,197

6 Claims. (Cl. 260—94.9)

This invention relates to an improvement in the removal of finely divided solids suspended in a solution of polymer in an inert solvent. In one aspect it relates to an improved method for effecting agglomeration of catalyst particles in a polymer solution so as to facilitate removal of said catalyst particles. In another aspect it relates to an apparatus for acheiving an improvement in the agglomeration of catalyst particles suspended in a solution of polymer and solvent.

When a finely divided solid is dispersed in a liquid having an appreciable viscosity, for example a suspension of finely divided catalyst in a solution of polymer in solvent, it is often difficult to cause sufficient coagulation or agglomeration of the particles to achieve a separation of the solids from the liquid. In such systems it is some times necessary to add an extraneous material as coagulant in order to achieve sufficient agglomeration or coagulation to make separation, of the solid from the liquid, possible or practical.

It is therefore a principal object of this invention to provide an improvement in the separation of finely divided and suspended solids from solutions containing such solids.

Another object of the invention is to provide a method and means for removing finely divided catalyst particles from a solution of a polymer and a solvent. Other and further objects and advantages will be apparent to one skilled in the art upon study of the disclosure of the invention including the detailed description and the appended drawing.

Figure 1 of the drawing shows, partially in elevation and partially in section, one modification of the apparatus of this invention.

Figure 2 is a view of Figure 1 along line 2—2.

I have discovered that the finely divided solid catalyst used in the polymerization of a 1-olefin such as ethylene to produce a normally solid polymer can be removed more effectively from the produced polymer solution by passing this solution upwardly through an elongated, vertical column wherein the liquid contained in the column is caused to rotate about its vertical axis. The temperature of the solution is maintained during its ascent through the column at that of incipient precipitation of polymer. The catalyst particles are agglomerated by the precipitating polymer and settle to a reservoir below the column from which the agglomerated catalyst is removed from the system.

I have found that a smooth edged plate or band positioned in the column so as to divide the column into substantially equal vertical zones, and rotated will cause the desired rotation of the liquid in the column. The agglomerated particles do not foul this spinning band and motion, without undue agitation, can be achieved.

I have also found that the separation of agglomerated catalyst from polymer solution is facilitated by maintaining a liquid in the zone below the column which is immiscible with and more dense than the solution of polymer. It is not necessary to control the temperature of this liquid except to avoid thermal turbulence in the column.

The present invention is broadly applicable to the separation of solid materials from solutions of polymers in any type of solvent. However, the invention is especially applicable to the separation of suspended catalysts from solutions of polymers obtained according to the copending patent application of J. P. Hogan et al., Serial No. 573,877, filed March 26, 1956, now Patent No. 2,825,721. As set forth in the copending application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to about 1500° F., preferably from about 900 to about 1000° F., for example, with a stream of substantially anhydrous oxygen-containing gas, such as air. The olefin feed used for the polymerization is at least one olefin selected from the class of 1-olefins having a maximum chain length of eight carbon atoms and no branching nearer the double bond than the four-position. Examples of such olefins are ethylene, propylene, 1-butene, and 1-pentene. Copolymers, such as ethylene-propylene copolymers can be prepared by the described method. The polymerization can be effected at a temperature in the range of 150 to 450° F. The pressure can range from approximately atmospheric to as high as 1000 p.s.i.

A satisfactory method of conducting the polymerization comprises contacting an olefin with a slurry of catalyst in a hydrocarbon solvent which can exist as a liquid at the temperature and pressure of polymerization and the reaction pressure need be only sufficient to maintain the solvent substantially in the liquid phase and will ordinarily range from about 100 to about 700 p.s.i. When a solvent is so used, the reaction effluent comprises a mixture of solvent and polymer and contains finely divided suspended catalyst. A method for separating the catalyst from the reaction effluent is often necessary if a polymer product of acceptable ash content is to be produced.

Suitable solvents for use in the above-described process are hydrocarbons which are liquid and chemically inert under the reaction conditions. Solvents which can be advantageously used include paraffins, such as those having 3–12, preferably 5–9, carbon atoms per molecule, for example, 2,2,4-trimethylpentane (isooctane), normal hexane, normal decane, isopentane, and the like. Another class of solvents which can be used are naphthenic hydrocarbons having from 5–6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. The preferred subclass of naphthenic hydrocarbons within the above-defined general class is constituted by those naphthenic hydrocarbons having from 5–6 carbon atoms in a single ring and from 0–2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

In copending application Serial No. 590,567, filed June 11, 1956, by G. T. Leatherman et al., there is disclosed a method for producing a novel polymer of ethylene which is based on the discovery that there is a critical polymerization range within the broad range disclosed in Serial 573,877 and that by carrying out the polymerization of ethylene and mixtures of ethylene with other unsaturated hydrocarbons at temperatures within this critical temperature range, certain unexpected results and advantages are obtained, especially with relation to the yield and the form of ethylene polymers. When utilizing butane and higher paraffinic hydrocarbons as the solvent or reaction medium, the polymerization temperature is generally in the range of about 230° F. and below, preferably 225° F. and below. Propane having a critical temperature of about 206° F. is useful in the range in which it can be maintained in the liquid phase. The temperature range for naphthenic hydrocarbon is about 190° F. and below, preferably about 180° F. and below. If mixtures of paraffinic and naphthenic hydrocarbons are employed the upper temperature limit will be between 190 and 230° F., depending upon the composition of the mixture. When operating according to the disclosed temperatures and other operating conditions substantially all of the polymer produced is insoluble in the diluent and is in solid particle form, the particles being substantially non-tacky and non-agglutinative and suspended in the liquid diluent. When the agglomeration procedure of this invention is applied to the reactor effluent of this process the temperature of the reactor effluent is raised sufficiently to dissolve all of the polymer before entering the agglomerator.

As is well known a polymer of a certain average molecular weight is composed of a number of polymers having higher and lower molecular weights. For example, a polymer having an average molecular weight of 50,000 may contain some polymer of a molecular weight as low as 1000 as well as polymer of a molecular weight as high as 200,000. At a temperature slightly above that at which most of the polymer in a polymer solution precipitates, there is a region of incipient precipitation at which temperature some of the higher molecular weight polymer precipitates. The temperature range of this region of incipient precipitation will vary with the particular solvent used and the molecular weight distribution of the polymer in solution, and generally will be between 1 and 30° F. above the temperature at which most of the polymer precipitates usually referred to as the cloud point of the solution.

The concept of cloud point and methods for determining cloud point are well known in the art of hydrocarbon chemistry. Thus, a homogeneous mixture of two or more components can be cooled to a particular temperature at which the appearance of a separate phase, enriched with respect to at least one of the components, is detected. The temperature at which the appearance of such a phase is noted is generally termed the "cloud point," since it is detected by the appearance of turbidity or precipitation. There is usually a maximum solution temperature; however, the invention is concerned with the lower or minimum solution temperature and therefore the cloud point as used herein refers to the minimum solution temperature.

The minimum solution temperature or cloud point of a solution of any particular polymer in a hydrocarbon solvent depends upon the particular hydrocarbon, the nature of the polymer, the concentration of polymer in the hydrocarbon, the molecular weight of the polymer, and other factors, so that a definite temperature applicable to all solutions of polymers in hydrocarbons cannot be stated with complete accuracy. Nevertheless, the cloud point of any particular polymer-hydrocarbon mixture can be determined readily by those skilled in the art by mere routine test, which comprises heating the particular mixture to a temperature at which a single homogeneous liquid solution or phase occurs, as indicated by a visual observation, slowly cooling this solution until cloudiness, which indicates formation of a second phase, is detected. Thus, it has been found that isooctane (2,2,4-trimethylpentane) containing 3 weight percent of ethylene polymer (40,000 molecular weight) has a cloud point of about 188° F. and isooctane containing 5.2 weight percent of the same ethylene polymer has a cloud point of 196° F. and isooctane containing 13.2 weight percent of ethylene polymer (47,000 molecular weight) has a cloud point of about 202° F. In the case of cyclohexane, a solution containing 5 weight percent of ethylene polymer of 48,000 molecular weight has a cloud point of about 188° F. while a solution containing 10 percent by weight of the same polymer has a cloud point of about 189° F. The ethylene polymer in each case was prepared by polymerizing ethylene in the presence of a chromium oxide-silica-alumina catalyst. Thus the temperature of incipient precipitation of ethylene polymer in cyclohexane will be in the range of about 190 to about 215° F. A temperature in the range of about 195 to about 205° F. will usually effect satisfactory agglomeration.

As hereinbefore stated incipient precipitation occurs above the cloud point even though this phenomenon cannot be detected by visual observation. The determination of incipient precipitation can be determined in many cases by the use of an instrument such as a nephelometer, a photometer, or any other suitable instrument which measures the light absorption or the scattering effect produced by the precipitation of solids or liquids from solution. Such instruments are well known in the analytical and instrumental control arts.

Reference is now made to the drawing wherein one specific embodiment of the invention is illustrated. An apparatus comprising a column 10 housing a band 11 rotatable through shaft 12 and variable speed motor 13 is vertically positioned upon and contiguous with a reservoir 14 of greater diameter than that of column 10, in which there is located a variable speed agitator-chopper 27 driven by motor 28. The feed stream enters via conduit 15 and the product comprising solvent and dissolved polymer is recovered via conduit 16. Conduit 17 connects the reservoir vessel 14 and separation zone 18, which can be a centrifuge, filter or other known means for effecting separation of solids from liquids. The agglomerated solids are removed from separation zone 18 via conduit 19 and liquid recovered from separation zone 18 is passed via conduit 20, either to disposal by means of valve 21 and conduit 22 or is returned to the reservoir vessel 14 via conduit 24 through valve 23. Conduit 26 is equipped with valve 25 which is provided to make-up liquid to the liquid flowing in lines 20 and 24 when additional liquid is required. The principal function of the agitator-chopper 27 is to prevent over-agglomeration and to maintain uniformity of the slurry in reservoir 14 to insure easy handling of the slurry stream removed from reservoir 14.

The feed stream in conduit 15 can be cooled from reaction temperature to the upper portion of the temperature range of incipient precipitation, or slightly above that range and further cooling can be accomplished in column 10, or the feed stream in conduit 15 can be cooled to the desired temperature in the range of incipient precipitation just prior to entering column 10 and that temperature maintained in column 10. Conduit 15 and column 10 can be jacketed so as to accommodate a heat exchange fluid or other known means of heat exchange can be employed.

The liquid in reservoir 14 preferably will be cyclohexane, however, it can be a heavier, immiscible liquid, such as a mixture of alcohol and water having a specific gravity between about 0.85 and 0.95, when measured at 60° F. Mixtures of water with light liquids such as ethyl alcohol, methyl alcohol, propyl alcohol, acetone, and the like are applicable, however, purification steps will be required to remove such materials from recycled cyclohexane.

The following specific embodiments of the invention will be helpful in understanding the invention since they are exemplary of the invention but are not to be construed as limiting the invention. Solid ethylene polymers are produced by contacting a mixture of ethylene and cyclohexane with a finely divided catalyst comprising chromium oxide, supported on silica-alumina, which is maintained as a slurry in the liquid at a temperature in the range of 290 to 300° F. and a pressure of about 450 p.s.i.g. The catalyst is prepared by impregnating a 90-10 silica-alumina coprecipitated gel composite with an aqueous solution of chromium trioxide, drying and heating for several hours in a stream of anhydrous air at about 950° F. The particle size of the finished catalyst is from 40 to 100 mesh. Ethylene is separated from the reactor effluent and is returned to the reaction chamber and the ethylene-free effluent stream is passed to the agglomerator.

In one modification an agglomerator, substantially as shown in the drawing, is constructed so that the reservoir 14 is 1½ feet high and is 6 inches in diameter. The column 10 which houses the spinning band is 3½ inches in diameter and is 10 feet high. The reactor effluent comprises a stream which is passed to the agglomerator at the rate of 2500 lbs. of cyclohexane, 100 lbs. of polymer, and 1 lb. of catalyst per hour. The temperature of the stream entering the agglomerator is about 217° F. and the pressure is maintained between 400 and 450 lbs. so that boiling of the liquid is prevented.

A slurry of cyclohexane and agglomerate is removed from the reservoir section at a rate sufficient to remove about 1 lb. of agglomerated catalyst per hour. Cyclohexane is added to maintain the volume sufficient for proper circulation and to prevent or discourage polymer solution from migrating from the column to the reservoir 14. The spinning band 11 is rotated at from 30 to 45 r.p.m. and a stream comprising 2500 lbs. of cyclohexane and 99 lbs. of polymer per hour is removed from the top of the column 11 at a temperature of about 210° F. The agglomerated catalyst, containing some polymer, is removed from the slurry withdrawn from the reservoir 14 and the cyclohexane is cooled before being returned to the reservoir 14 as the temperature of the reservoir 14 tends to build up as a result of inadequate cooling through radiation and it is desirable to maintain the cyclohexane in the reservoir 14 at a temperature lower than that of the feed to the column 10 to increase the density and reduce polymer dissolving property of the cyclohexane in the reservoir. The reactor effluent stream is cooled to the temperature range of incipient precipitation in traversing column 10 containing the spinning band 11.

In a second specific embodiment an agglomerator substantially as shown in the drawing is constructed having a reservoir 3 feet high and 16 inches in diameter and a column 10 inches in diameter and 17 feet high. This agglomerator is operated by passing a reactor effluent stream comprising 20,000 lbs. of cyclohexane, 800 lbs. of polymer, and 8 lbs. of catalyst per hour to the base of the column 10 at a temperature of about 217° F. with the spinning band rotating at about 20 to 30 r.p.m. A stream comprising 792 lbs. of polymer and 20,000 lbs. of cyclohexane per hour is removed from the top of the column 10 at a temperature of about 210° F. Cyclohexane is circulated through the reservoir at a rate sufficient to remove 8 lbs. of catalyst and 8 lbs. of polymer per hour. Additional cyclohexane is added to maintain the interface 29 of the cyclohexane and the reactor effluent at the junction of the column and reservoir of the agglomerator. The agglomerator of this embodiment has a capacity of 19,000 lbs. of polymer per day based on the reaction yield of 100 lbs of polymer per lb. of catalyst. The agglomerated catalyst is removed from the liquid by a filter, centrifuge or other liquid-solids separation means.

If the band 11 is rotated too rapidly, carry over of agglomerate with the polymer and cyclohexane stream will occur and if the band is rotated too slowly satisfactory agglomeration will not occur and free catalyst will be carried over in that stream. Thus examination of the stream in conduit 16 for agglomerate or non-agglomerated catalyst will indicate if the band 11 is being rotated too rapidly or too slowly.

Reasonable variations and modifications are possible within the scope of this disclosure without departing from the spirit and scope of the invention.

That which is claimed is:

1. An improved method for removing suspended solids from a solution of a solid polymer in a solvent which comprises passing said solution containing said solids into a substantially vertical, cylindrical zone substantially divided into two equal portions by a vertical impervious partition, at about the temperature of incipient precipitation of polymer from solution; rotating the partition about its vertical axis at a solids agglomeration rate but insufficient to prevent gravitation of agglomerated solids so as to effect agglomeration of said solids into particles of sufficient bulk to gravitate from the solution; passing gravitating solids into a zone below and contiguous with said first named zone; recovering polymer solution from the upper portion of said first named zone; measuring the agglomerate and catalyst content of the recovered polymer solution; regulating the rate of rotation of said partition so as to maintain the agglomerate and catalyst content of said recovered polymer solution at a minimum; introducing liquid into said zone below said first-named zone at a rate sufficient to maintain a liquid interface between said zones; and removing agglomerated solids from said zone below said first named zone.

2. The method of claim 1 wherein the liquid introduced into the zone below said first named zone is said polymer solvent.

3. The method of claim 1 wherein the liquid introduced into the zone below said first named zone is a liquid immiscible with said solvent and having a specific gravity greater than that of solvent.

4. In the process for producing normally solid polyethylene which comprises reacting ethylene in the presence of liquid cyclohexane and a catalyst comprising chromium oxide containing an appreciable amount of hexavalent chromium deposited upon a co-precipitated gel of silica and alumina and having a particle size of 40 to 200 microns at a temperature in the range of 290 to 300° F. and a pressure of about 400 p.s.i. so as to produce a solution of polyethylene in cyclohexane and containing suspended therein particles of catalyst, the improvement which comprises passing said mixture of polyethylene solution and suspended catalyst solids into a substantially vertical cylindrical zone substantially divided by a vertical impervious partition into two zones of equal volume, at about the temperature of incipient precipitation of polyethylene from solution; rotating the partition about its vertical axis at a solids agglomerating rate and a peripheral velocity which does not exceed about 15 in. per second so as to impart rotational motion to the two vertical columns of solution with resultant agglomeration of said catalyst particles into particles of sufficient bulk to gravitate from the solution; maintaining the ascending columns of solution at about the temperature of incipient precipitation of polyethylene from solution; passing gravitating catalyst particles into a zone below and contiguous with said first named zone; recovering polyethylene solution from the upper portion of said first named zone; measuring the agglomerate and catalyst content of the recovered polymer solution; regulating the rate of rotation of said partition so as to maintain the agglomerate and catalyst content of said recovered polymer solution at a minimum; introducing liquid into said zone below said first-named zone at a rate sufficient to maintain a liquid interface between said zones; and removing agglomerated catalyst particles from said zone below said first named zone.

5. The method of claim 4 wherein the zone below the first named zone contains cyclohexane.

6. The method of claim 4 wherein the zone below the first named zone contains a mixture of alcohol and water having a specific gravity in the range of 0.85 to 0.95 at 60° F.

References Cited in the file of this patent

UNITED STATES PATENTS

| | | |
|---|---|---|
| 2,448,927 | Fischer | Sept. 7, 1948 |
| 2,510,781 | Howard | June 6, 1950 |
| 2,642,991 | Davis | June 23, 1953 |
| 2,825,721 | Hogan et al. | Mar. 4, 1958 |